June 1, 1965

M. G. MARTINEZ 3,186,633

COMPRESSORS

Filed June 12, 1962

INVENTOR

MARTIN GOMEZ MARTINEZ

United States Patent Office 3,186,633
Patented June 1, 1965

3,186,633
COMPRESSORS
Martin Gomez Martinez, Zaragoza, Spain
Filed June 12, 1962, Ser. No. 201,831
Claims priority, application Spain, June 15, 1961,
268,273; May 30, 1962, 277,852
9 Claims. (Cl. 230—190)

The present invention relates to improvements in compressors and in particular to a novel and more simplified kind of compressor having neither intake nor exhaust vales, and which is of higher efficiency and less cost than conventional compressors with automatic valves.

Figure 1:
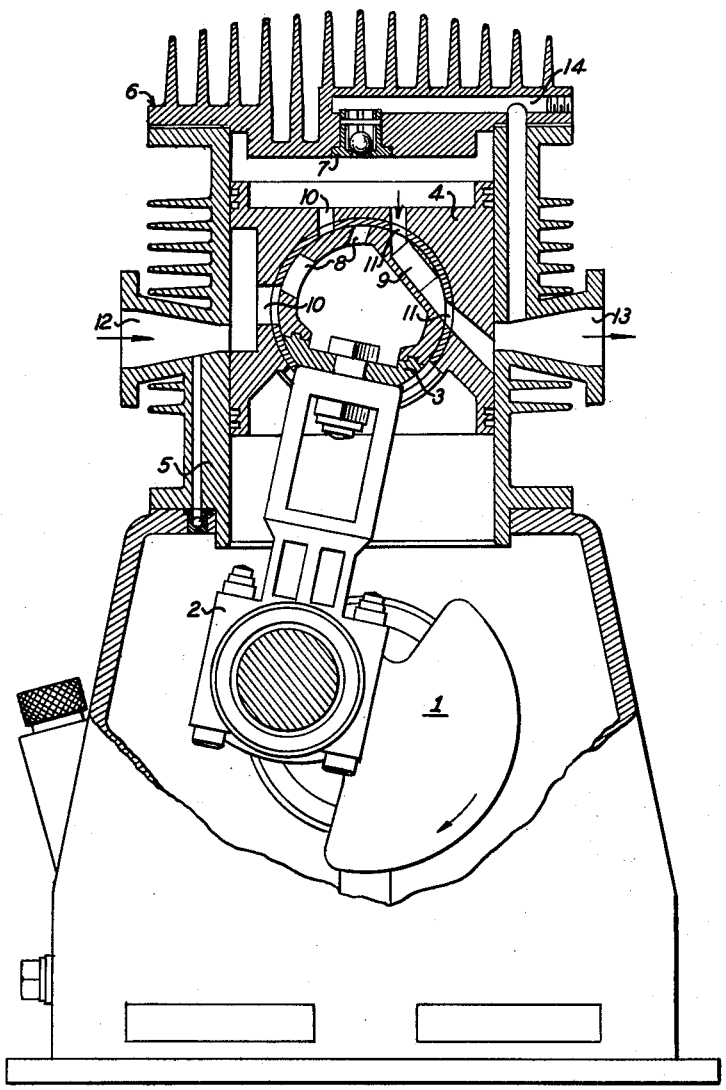
FIG. 1 is a cross-sectional view of the compressor.

The piston rod can be considered as a "distributor" piston rod by virtue of its dual function, namely for performing the ordinary function of a piston rod, while also acting as a distributor of fluid flow for accomplishing with absolute precision the complete cycle of intake, compression and exhaust.

The elements of the compressor, are listed in numerical order as follows:

(1) The crankshaft
(2) The connecting rod
(3) The "distributor" piston rod
(4) The piston
(5) The cylinder
(6) The cylinder head
(7) The compensator for starting without load
(8) The intake ports of the "distributor" piston rod
(9) The exhaust port of the "distributor" piston rod
(10) The intake ports of the piston
(11) The exhaust ports of the piston
(12) The intake port of the cylinder
(13) The exhaust port of the cylinder
(14) The compensator duct for starting without load.

Upon rotation when driven by an engine, the crankshaft 1 transforms its continuous circular movement into a reciprocating linear motion of the piston 4 by means of the connecting rod 2. Said connecting rod 2 is mounted to the "distributor" piston rod 3 and produces an angular rotation of the referred to "distributor" piston rod.

Said "distributor" piston rod is hollow and the intake ports 8 penetrate to the internal portion thereof. The exhaust port 9 crosses through the "distributor" piston rod, but establishes no communication with the internal portion of said piston rod. This "distributor" piston rod is composed of a lower portion 15 and an upper portion 16 enabling adjustment of the upper portion at all times. The explanation is as follows: during compression, the connecting rod pushes the piston upward and thus adjustment is ensured between the ports of the "distributor" piston rod and piston; during the intake stroke, the connecting rod *pulls* the piston downward, at which time escape of the fluid would be produced if there were play between these elements since a space would be located between the top portion of the piston rod and the piston. This inconvenience is overcome by virtue of the two-piece "distributor" piston rod, in which the upper half of the piston rod, by reaction, tends to be compressed against the piston, when the piston is drawn downward by the connecting rod, for as will be observed in the drawing, only the lower portion of the "distributor" piston rod is coupled to said connecting rod.

Figure 2:
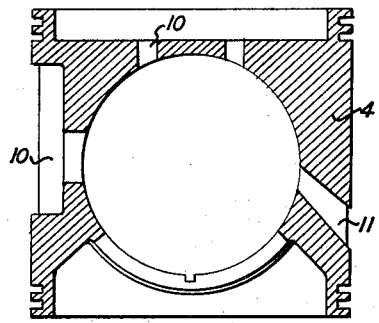
FIG. 2 is a cross-sectional view along the line A—A in FIG. 3.
Figure 3:
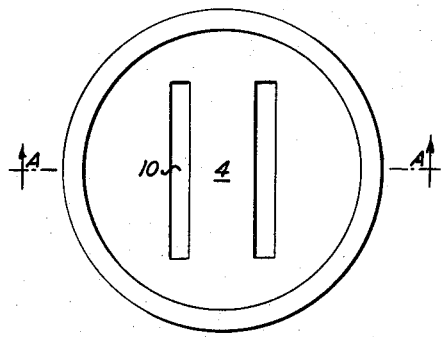
FIG. 3 is a plan view of the piston.
Figure 4:
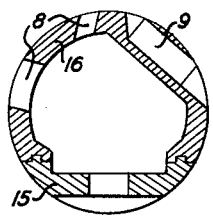
FIG. 4 is a cross-sectional view along the line B—B in FIG. 5.
Figure 5:
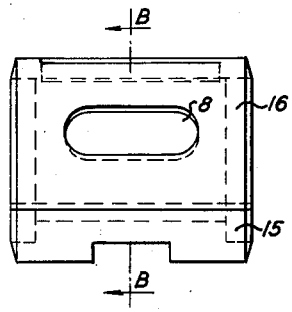
FIG. 5 is a rear view of the piston rod.

The piston 4, as shown in FIGS. 2 and 3, is likewise provided with two ports on the flat end of its upper portion, and another two on opposite sides of the skirt, all of which penetrate to the interior of the bore in which the "distributor" piston rod is housed and rotates.

During descent, i.e. the intake stroke of the piston 4 and due to angular rotation of the "distributor" piston rod 3, the intake ports 8 of said rod are aligned with the intake ports 10 of the piston and air is drawn in through said aligned ports 8, 10 and the intake port 12 of the cylinder 5. At the end of the intake stroke, the ports of the rod and piston no longer are aligned, and the air that has penetrated to the cylinder 5 is compressed by the piston 4 during its upward compression stroke.

From the initiation of the compression stroke onward the exhaust ports 9 of the "distributor" piston rod gradually coincide with the exhaust ports 11 of the piston to thereby gradually open the exhaust ports, however, the air cannot be discharged from the cylinder 5 until the piston 4 has traveled approximately two-thirds of its upstroke, at which moment the exhaust port 11 in the skirt of the piston 4 coincides with the exhaust port 13 of the cylinder 5. This lack of coincidence during exhaust until the piston 4 has traveled approximately two-thirds of its compression stroke, has been devised so that the air is compressed in the cylinder 5 to a magnitude corresponding to the pressure of the air in the storage tank, which is from 6 to 8 kg./cm.$^2$.

By this means the unavoidable constant pressure during the air exhaust period, only takes place during the last third of the upstroke of said piston 4, as during this last third of the upstroke the air is discharged from the cylinder to the storage tank.

At the end of the compression stroke, the ports which coincided during the exhaust stroke, are closed and the intake ports are re-opened thereby completing the cycle.

The function of the pressure compensator 7 is to avoid unnecessary pressure in the cylinder during starting periods, that is to say, until the pressure in the air storage tank reaches its normal working value of 6 to 8 kg./cm.$^2$ Until this time and provided a pressure higher than that of the tank is produced in the cylinder 5, by virtue of the fact that the ports 11 of the piston have not yet coincided with the exhaust port 13 of the cylinder, a certain amount of the air being compressed will be discharged to the storage tank through the duct 14 via the locking ball of the compensator 7 and the exhaust port 13 of the cylinder 5.

The advantages which are obtained with the compressor according to the invention are:

(a) Elimination of the automatic valves conventionaly used in compressors, whose proper maintenance as is well known, is always cumbersome, susceptible to give rise to frequent breakdowns, decrease of volumetric efficiency of the compressor, increase of the clearance, reduction of the cooling surface of the cylinder head at the point to which they are applied, and limitation of the number of revolutions of the engine due to not acting as required at a high rating, and so forth.

(b) Exclusion of the assembly of parts constituting said valves and all elements required for mounting same. All these parts are relatively expensive.

(c) Dispersion of much more heat during compression, due to the fact that no valves are formed in the cylinder head and the entire surface thereof is thus available for cooling purposes.

(d) The possibility of a larger number of revolutions due to the fact that the intake, compression and exhaust cycle is ensured at any rating whatsoever.

(e) A better efficiency at all elevations due to the exclusion of automatic valves, which with their springs and diaphragms greatly decrease the volumetric efficiency in accordance with the diminution of density and atmospheric pressure of the air at increased altitudes.

(f) A noteworthy reduction of cost of the engine by virtue of its reduced number of component parts and the reduced size, for identical rating, due to increased number of revolutions. Moreover, the compressor only weighs half as much as any known type.

(g) A longer life of the engine due to having eliminated the components that are most liable to cause breakdowns.

(h) The fact that in the compressor the piston rod effects a dual function, that is to say, that while performing the duty of a normal piston rod, it simultaneously acts as a distributor element for a fluid.

Said piston rod acts as a distributor in the following manner: the piston rod effects two movements, i.e. an angular motion that is transmitted thereto by the connecting rod, as the former is mounted to this latter, and a second, i.e. linear motion during the up and down stroke of the piston. The angular motion produces coincidence of the "distributor" piston rod ports with those of the piston, whereas the linear motion produces coincidence of the piston skirt ports with those of the intake and exhaust ports of the cylinder.

Since during operation this coincidence of the ports follows accurately synchronized, it is therefore that a perfect distribution of the intake, compression and exhaust cycle is achieved.

(i) By utilizing the piston rod simultaneously as a distributor, the automatic valves are excluded, thus reducing the cost of the engine, achieving less weight rotating the engine at higher speeds, giving higher efficiency, longer life and less likelihood of breakdown.

(j) By forming the piston rod as a distributor, fluid leakage is eliminated that would be produced at the ports of the upper portion of the rod and piston during the downstroke of this latter by the thrusts of the connecting rod, since clearance between said elements would appear at this upper portion, and furthermore, at the moment of maximum return pressure, as during the first third of the downstroke, the exhaust port of the piston skirt is in communication with the exhaust port of the cylinder. These escapes are not produced due to the fact that adjustment is maintained as the upper portion of the "distributor" piston rod reacts upward when the piston is thrust downward.

(k) The fact that the pressure compensator by forming part of the cylinder head, excludes all unnecessary pressure during the starting period and until the pressure reaches the working pressure in the air storage tank.

(l) That the cylinder head by virtue of its special shape and the lack of valves, presents a large cooling surface for exclusion of a part of the heat generated during the compression period.

It should be stressed that although the accompanying drawing illustrates a single cylinder compressor, this engine can also be built with several cylinders in aligned, V or radial arrangement. Moreover, the compressor can have one or several compression stages and may also be cooled by air or by water.

It is therefore understood that all mechanical details can be altered within the knowledge of one skilled in the art without departing from the scope of the invention as defined in the claims and as particularly concerned with a compressor without intake and exhaust valves.

What is claimed is:

1. A compressor comprising a cylinder, a piston slidable in said cylinder, said piston having a cavity, a piston rod supported in said cavity for undergoing rotatable movement therein, means connected to said piston rod for reciprocally driving the piston rod and the piston therewith through compression and intake strokes while causing the piston rod to undergo synchronized rotatable movement within the cavity of the piston, said piston and piston rod being provided with ports which are respectively and selectively in communication with one another at specific positions of the piston rod within the piston and specific positions of the piston within the cylinder, said cylinder being provided with a separate fluid inlet and outlet which are in communication with the ports of the piston at specific positions of the latter within the cylinder such that fluid is admitted to said cylinder through the fluid inlet and through aligned ports in the piston rod and piston during an inlet stroke of the piston while the fluid is expelled from the cylinder under pressure through the fluid outlet and through other corresponding aligned ports in the piston and piston rod, said outlet port in the cylinder being operatively positioned with respect to the corresponding port in the piston to be in communication therewith only after the piston has completed a determinable portion of the compression stroke and for the remainder thereof.

2. A compressor which is free of valves comprising a cylinder, a piston slidable in said cylinder, said piston having a cavity, a hollow piston rod having a wall and supported in said cavity for rotation therein, means connected to said piston rod for driving the same and the piston therewith reciprocally in said cylinder through compression and intake strokes while rotating the piston rod in synchronism in the piston, said piston being provided with an inlet port, an outlet port, and a pair of further ports, the latter establishing communication between the cavity in the piston and the interior of the cylinder, said piston rod being provided with a first port through said wall and in communication with the inlet port in the piston during the intake stroke and a second port through said wall in communication with one of said further ports during said intake stroke and establishing communication between said inlet port of said piston and said cylinder through the hollow piston rod, said piston rod being further provided with an exhaust port extending in said wall for communication only with the other of said ports in said piston and the outlet port of the piston during the compression stroke, said cylinder having a wall in which passes said piston as the same undergoes reciprocal movement in said cylinder, said wall of said cylinder being provided with an inlet port and an outlet port, the inlet port of the cylinder wall being in communication with the inlet port of the piston during the intake stroke of the latter whereby fluid is introduced into said cylinder through the inlet port in the cylinder wall, the inlet port of the piston, the first and second ports in the wall of the piston rod, and the said one further port in the piston, said outlet port in the cylinder wall being located therein for being in communication with the outlet port in the piston only after a prescribed portion of the compression stroke and for the remainder thereof whereby compressed fluid from said cylinder is discharged through the outlet port in said cylinder wall via the other of said further ports in said piston, the exhaust port of the piston rod and the outlet port of the piston.

3. A compressor as claimed in claim 2 wherein said outlet port in the cylinder wall and the outlet port of the piston are respectively located therein such that they first come into communication with one another only after substantially two-thirds of the compression stroke has been completed.

4. A compressor as claimed in claim 2 wherein said means connected to the piston rod for driving the same includes a connecting rod and a crankshaft, said connecting rod having a flat surface, said piston rod having a flat surface in contact with and secured to the flat surface of the connecting rod.

5. A compressor as claimed in claim 2 wherein said piston rod is divided and comprises an upper wall portion and a lower wall portion in which the upper wall portion freely rests on the lower wall portion, said means which is connected to the piston rod being only connected to the lower wall portion thereof.

6. A compressor as claimed in claim 2 wherein said wall of said hollow piston rod defines a hollow interior space, said first and second ports extending through said walls and opening into said hollow interior space of the piston rod while said exhaust port extends in the wall and is outside the hollow interior space and fails to make communication therewith.

7. A compressor as claimed in claim 2 wherein said inlet ports in said cylinder and said piston are perpendicular to the direction of the stroke of the piston, said further ports in the piston extending in the direction of the stroke, said outlet port in the cylinder extending perpendicular to the direction of the stroke while said outlet port in the piston is inclined with respect to the direction of the stroke.

8. A compressor as claimed in claim 2 comprising pressure compensator means in said cylinder facing said piston for relieving pressure in said cylinder during first starting of the compressor.

9. A compressor as claimed in claim 8 wherein said pressure compensator means comprises a ball valve in communication with said cylinder and a duct leading from said ball valve externally of the cylinder, said duct being adapted for being connected to a storage tank.

References Cited by the Examiner

UNITED STATES PATENTS

| | | | |
|---|---|---|---|
| 405,150 | 6/89 | Dodd | 121—123 X |
| 725,911 | 4/03 | Alsterlund | 121—123 |
| 906,773 | 12/08 | Cole | 123—47 X |
| 1,006,980 | 10/11 | Reavell et al. | 230—190 |
| 1,260,939 | 3/18 | Nickerson | 121—123 |
| 1,970,260 | 8/34 | Tubbs et al. | 230—221 |
| 2,405,475 | 8/46 | Voreaux | 230—190 |

FOREIGN PATENTS

| | | |
|---|---|---|
| 20,550 | 12/89 | Great Britain. |
| 617,663 | 2/49 | Great Britain. |

LAURENCE V. EFNER, *Primary Examiner.*

JOSEPH H. BRANSON, Jr., *Examiner.*